Dec. 16, 1952 M. H. GRAHAM 2,621,730
TIMING DEVICE
Filed July 3, 1948 6 Sheets-Sheet 1

INVENTOR
MAURICE H. GRAHAM
BY William C. Babcock
ATTORNEY

Dec. 16, 1952 M. H. GRAHAM 2,621,730
TIMING DEVICE
Filed July 3, 1948 6 Sheets-Sheet 3

INVENTOR
MAURICE H. GRAHAM
BY William C. Babcock
ATTORNEY

Dec. 16, 1952  M. H. GRAHAM  2,621,730
TIMING DEVICE
Filed July 3, 1948  6 Sheets-Sheet 4
FIG. 4
FIG. 5
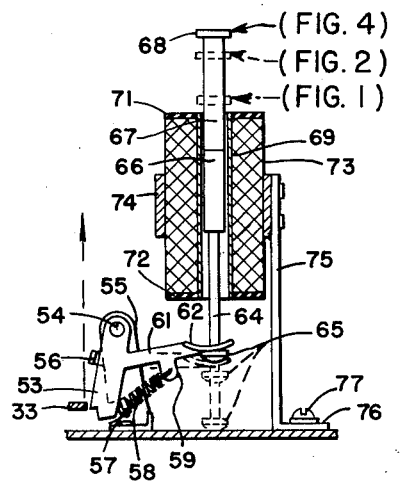
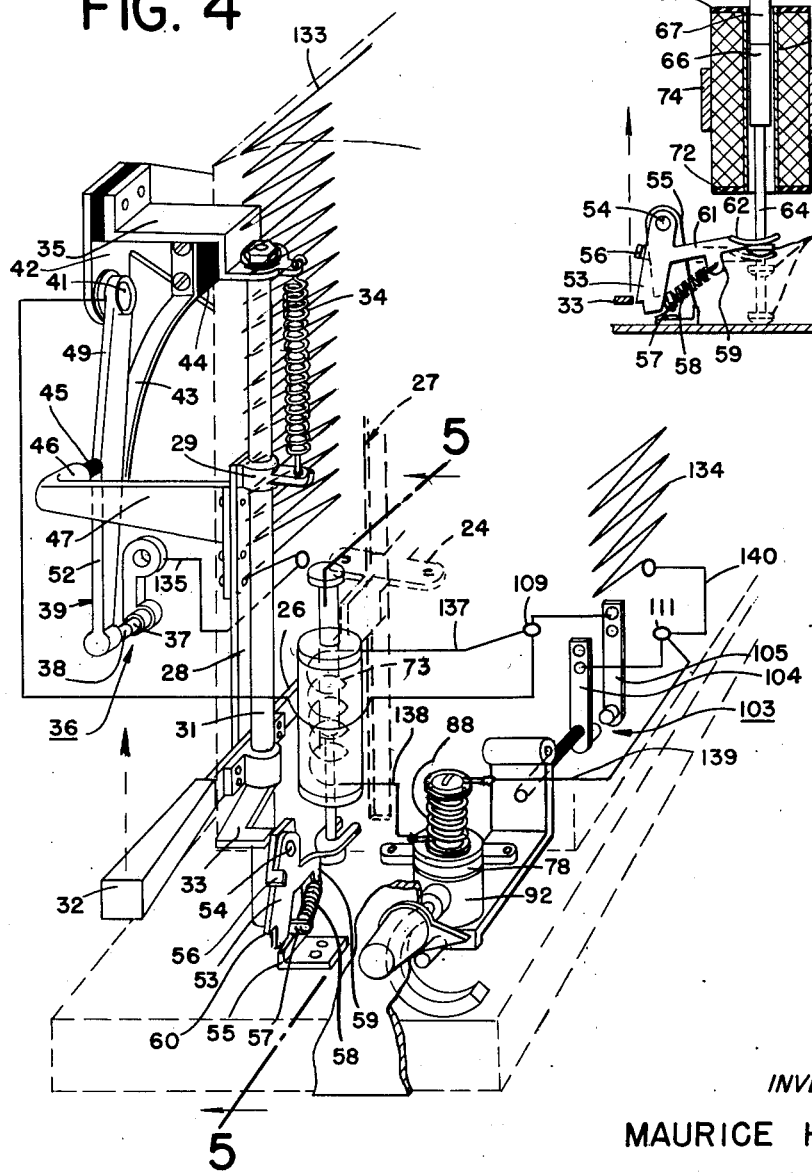
INVENTOR
MAURICE H. GRAHAM
BY William C. Babcock
ATTORNEY Dec. 16, 1952      M. H. GRAHAM      2,621,730
TIMING DEVICE
Filed July 3, 1948      6 Sheets-Sheet 5
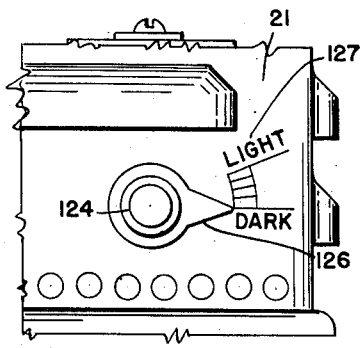
FIG. 8
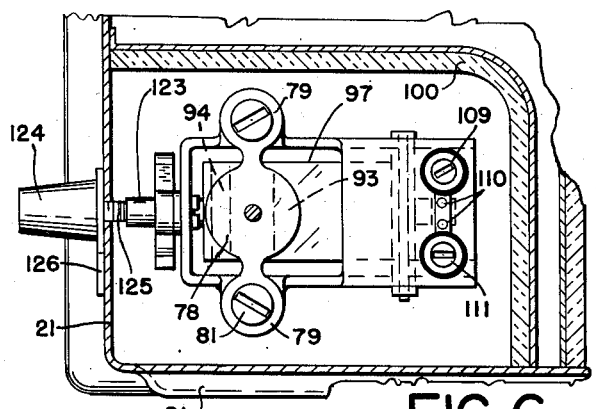
FIG. 7
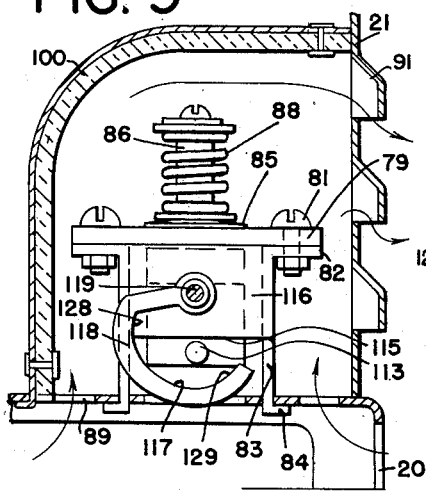
FIG. 9
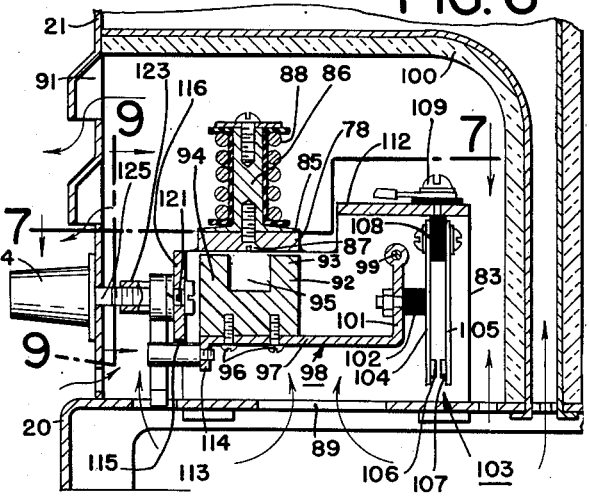
FIG. 6
FIG. 10
INVENTOR
MAURICE H. GRAHAM
BY *William C. Babcock*
ATTORNEY Dec. 16, 1952 M. H. GRAHAM 2,621,730
TIMING DEVICE
Filed July 3, 1948 6 Sheets-Sheet 6
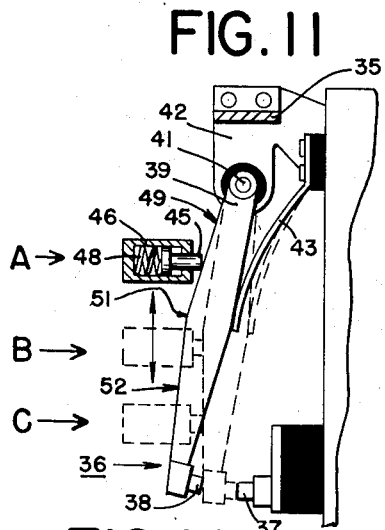
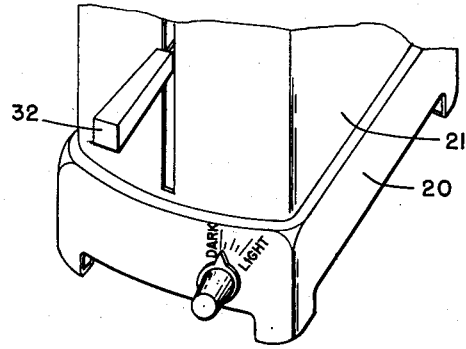
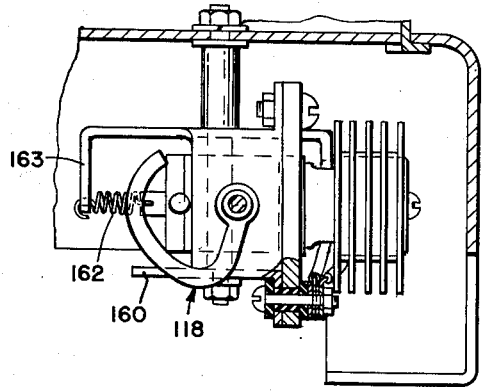
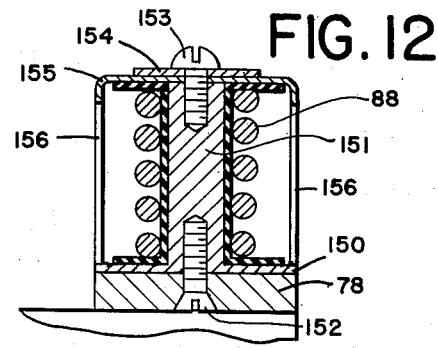
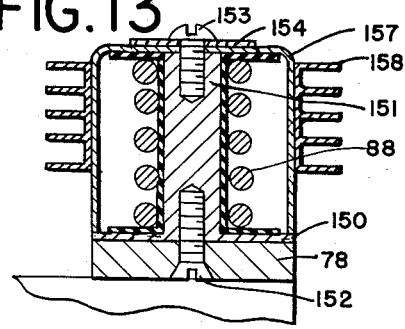
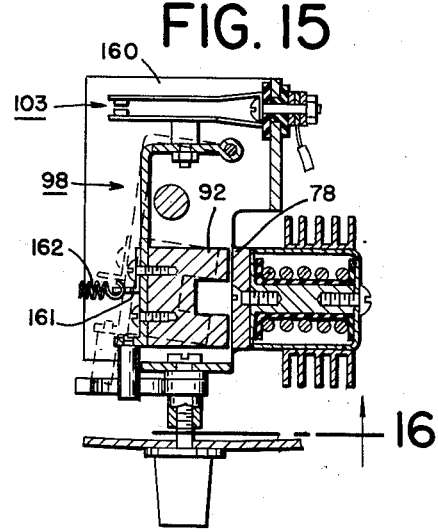
INVENTOR
MAURICE H. GRAHAM
BY *William C. Babcock*
ATTORNEY Patented Dec. 16, 1952

2,621,730

UNITED STATES PATENT OFFICE 2,621,730

TIMING DEVICE

Maurice H. Graham, Minneapolis, Minn., assignor to General Mills, Inc., a corporation of Delaware Application July 3, 1948, Serial No. 37,041

14 Claims. (Cl. 161—1)

This application relates to an improved timing device, which can be used to operate a switch or relay, release a latch, or terminate a given operation after a predetermined time interval. It is particularly useful as a timer for electrical appliances such as electric toasters, although its use is not limited to such devices.

Various timing devices have been proposed for controlling the energization of an electrical circuit such as the heating resistance in a toaster or cooker. Most of these devices make use either of a clockwork mechanism, or a thermostatic device, i. e., an expandable rod or a bi-metallic warp bar.

A timer has also been suggested which utilizes the loss of magnetic permeability of certain alloys with increased temperature, to control the duration of the desired operation. Such alloys are generally designated as "reversible" or "thermomagnetic," and are well known in themselves. However, their use in timers of the type proposed has not been particularly extensive or successful, as far as I am aware. It is my observation that the suggested construction is unsatisfactory, because it gives relatively variable results and is not sufficiently accurate to meet the close timing tolerances required for most commercial applications, such as cooking or toasting. I have further found that one reason for these inaccuracies is the lack of uniformity in instantaneous temperatures throughout the operative surface of the thermomagnetic material.

It is accordingly one object of the present invention to provide an improved timing device for electrical appliances of the type which makes use of the change in magnetic permeability of certain alloys with respect to temperature.

It is another object of the invention to provide a timer whose action is controlled by relative movement of a magnet and a plate of "thermomagnetic" material due to the changes in magnetic permeability of the plate resulting from application of controlled temperature conditions to said plate.

It is an additional object to provide a thermomagnetic timer in which the time period is accurately controlled and easily adjusted.

It is another object to provide such a timer in which the thermomagnetic member is uniformly heated throughout the surface area with which the magnet cooperates.

It is still another object of the invention to provide a thermomagnetic timer with an auxiliary heater and an intermediate thermally conductive member for even distribution of heat from the heater to the thermomagnetic material of the timer.

It is a further object to provide a thermomagnetic timer in which the time period is readily adjustable by variation in the air gap between the magnet and the thermomagnetic material.

Other objects and advantages of the invention will be readily apparent from the following specification.

In order that those persons skilled in the art may understand the nature and working of my improved timer, I have shown in the drawings which form a part of this specification various exemplary embodiments of the invention. In these drawings, Figure 1 is a perspective schematic view of a toaster embodying my improved timing device or mechanism in normal or inoperative position. Certain parts are broken away and others are dotted for the sake of clarity.

Fig. 4 is a similar view showing the parts at the end of the cycle just after release of the toast carrier.

Fig. 5 is a detail view, partly in section, of the latch and release mechanism for the toast carrier.

Fig. 6 is a sectional view of the timing unit on the line 6—6 of Fig. 1.

Fig. 7 is a top sectional view of the unit, taken on the line 7—7 of Fig. 6.

Fig. 8 is a partial end view of the unit of Fig. 6.

Fig. 9 is a sectional view on the line 9—9 of Fig. 6.

Fig. 10 is an enlarged view similar to Fig. 6, showing the parts in the same position as exemplified in Fig. 4.

Fig. 11 is a side elevation of the main switch, the parts being in the position of Fig. 1.

Fig. 12 is a partial sectional view of a modification of the thermomagnetic heater housing.

Fig. 13 is a similar view of another modification in which the housing is provided with cooling fins.

Fig. 14 is a partial end perspective of a toaster showing the control knob of a modified timer.

Fig. 15 is a top sectional view of such a modified timer and

Fig. 16 is a view on the line 16 of Fig. 15.

Before a detailed description of the parts is given, the general operation of the electrical circuit will first be outlined.

General description

Briefly, my improved timing device makes use of a plate or member of "thermomagnetic" material, i. e., a material whose magnetic permeability changes with increase of temperature. A magnet is associated with this material in such a way that relative movement between the plate and magnet can be obtained. An auxiliary heater is likewise associated with the plate, and preferably with the face of the plate opposite to that associated with the magnet.

At the start of the timing cycle, the plate is at relatively normal temperature and the magnet is attracted to it so that the magnet and plate are relatively close together. In the initial portion of the timing cycle, the auxiliary heater raises the temperature of the plate until its permeability is no longer sufficient to attract the magnet. The magnet and plate then become relatively separated either by the action of gravity or by suitable resilient means or equivalent mechanical arrangement. The separating movement of the magnet and plate actuates a switch to de-energize the auxiliary heater and thereby permit the plate to cool. When the plate has cooled so as to re-acquire sufficient magnetic permeability, the magnet is reattracted and the magnet and plate move back to their original relative positions. As a result of the relative movement, the timed operation is terminated.

An adjustable control member is provided for variation of the amount of relative separation between magnet and plate in order to vary the duration of the timed period.

With this general description of the operation in mind, the detailed construction of one embodiment of my invention will now be described.

Toaster construction

Figure 1:
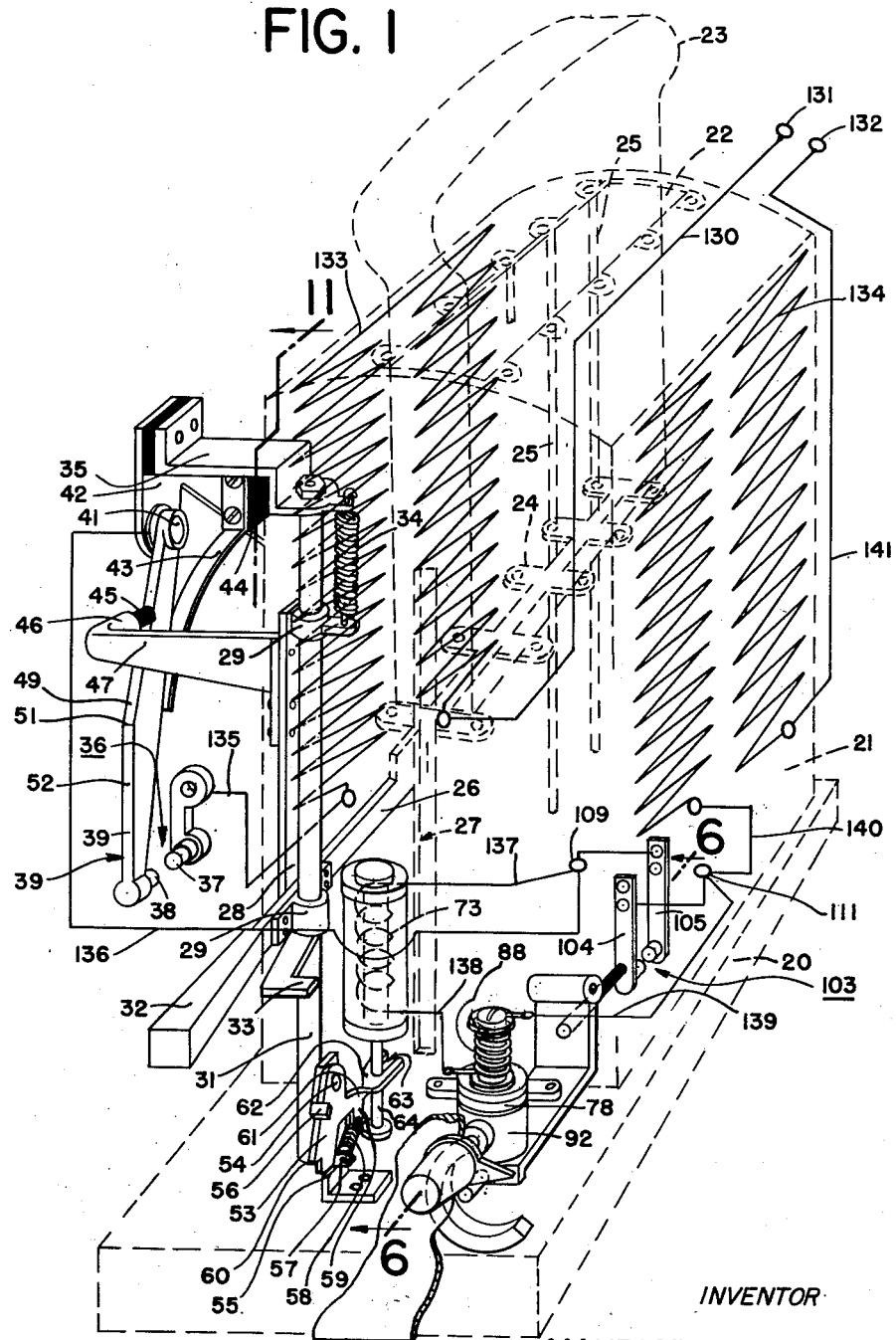

By way of example, I have shown my improved timing device in an automatic bread toaster of standard construction. It will be readily understood that the timer is suitable for use in any other cooking appliance or for that matter in any device in which releasing movement of a latch member is desired after a predetermined time. As shown in Fig. 1, the toaster includes a base 20 and an outer casing 21. This casing is provided at the top with an open slot 22 in which the usual slice of bread 23 may be inserted. The bread will be supported on a slice carrier 24 shown in dotted outline in the figure. This slice carrier 24 is vertically movable on guide rods 25 inside the casing. A supporting arm 26 is fastened to one end of the slice carrier and this supporting arm extends outwardly through a slot 27 in one end wall of the toasting chamber. A vertical slide 28 is fastened at its lower end to supporting arm 26 and suitable bearing members 29 are provided at the upper and lower ends of slide 28 for cooperation with the vertical supporting rod 31. Rod 31 is fastened to the base and frame of the toaster in any desired manner and serves to support the slide 28 and in turn the arm 26 and slice carrier 24 in an obvious manner. An operating handle 32 is provided at one end of supporting arm 26 and this handle projects from the main toaster casing 21 for convenient manipulation by the user. Supporting arm 26 also carries latch arm 33 adapted to cooperate with a latching member to be described. A spring 34 fastened at one end to upper bearing member 29 and at the other end to a bracket 35 serves to urge the slide 28 (and consequently the handle 32 and slice carrier 24) vertically upward so that the bread slice will project from the casing and will not be in operative position within the toasting chamber.

A main switch 36 is provided and this switch includes a fixed contact member 37 and a movable contact 38. Contact 38 is carried at the lower end of switch arm 39, the upper end of said switch arm being pivoted at 41 to a supporting bracket 42 connected to the main toaster frame. A resilient leaf or spring 43 mounted on an insulating bracket 44 engages the switch arm 39 and urges it in a direction so as to maintain switch 36 in a normally open position.

In order to move the switch arm 39 to closed position, I have provided a plunger 45 resiliently mounted in a cylindrical socket 46 at one end of a projecting arm 47 fastened to the vertical slide 28. As shown particularly in Fig. 11, a spring 48 inside the cylindrical socket 46 constantly urges the plunger outwardly against the switch arm 39.

As further shown in Fig. 11, the surface of switch arm 39 which is engaged by plunger 45, includes two parts disposed at an angle with respect to each other. Section 49 of the arm, which is nearest to the pivot 41, projects at an angle such that depression of handle 32 (and consequently of plunger 45) will cause the plunger first to engage this portion 49 of the switch arm 39 to move the switch arm to closed position. This closing movement will be completed when plunger 45 has moved approximately half way down through its normal stroke, or, in other words, from position A to position B as shown in Fig. 11. As soon as plunger 45 has passed downwardly beyond the point 51, which marks the end of surface 49, it will be obvious from the figure that the remaining portion 52 of the switch arm is arranged so that it is substantially vertical when the switch is in closed position. Thus, further movement downwardly of plunger 45 will cause no additional movement of the switch arm 39. Hence, it is apparent that the switch is closed during the first part of the movement of plunger 45 and that during the remainder of the downward movement of the plunger, the switch will remain in closed position. Due to the use of the spring 48 the plunger 45 can move slightly to adapt itself to irregularities in the surfaces 49 and 52 of the switch arm and also to maintain a definite spring tension against said arm to insure that the contacts 37 and 38 are in firm engagement with each other.

The purpose of this switch arrangement will be apparent from the further description below, it being sufficient to note at this point that the main switch is closed during the initial movement of the plunger 45 from position A to position B in Fig. 11 and that further movement of the plunger from position B to position C does not affect the operative engagement of the switch contacts 37 and 38.

Latch and latch release mechanism

With reference to Figs. 1 to 5, the construction of the latch and latch release mechanism will be described. As shown in the figures, a latch 53 is pivoted at 54 to a supporting bracket 55 fastened to the base 20 of the toaster. Bracket 55 is provided with a bent-over portion 56 which serves as a stop lug to limit clockwise rotation of the latch 53 as shown in Fig. 5. A second stop lug 57 is likewise formed on supporting bracket 55 and serves to limit rotation of latch 53 in the opposite, or counter clockwise, direction. A spring 58 is fastened at one end to stop lug 57 and at the other end to a projection 59 on tripping arm 61 of latch 53. This spring constantly urges the latch in a clockwise direction in order that the latching surface 60 of latch 53 will engage and hold the latch arm 33 at the appropriate time. Arm 61 of the latch terminates in a pair of spaced fingers 62 which form between them a slot 63 (Fig. 1) for engagement with rod 64 of a suitable solenoid. With particular reference to Fig. 5, rod 64 is vertically slidable and carries at its lower end a headed portion 65. Portion 65 engages with the base 20 of the toaster to limit the downward movement of rod 64 and engages the fingers 62 of the latch 53 to rock said latch in a counter clockwise direction when rod 64 moves upwardly, and thereby releases latch arm 33 at the proper time.

The upper end of rod 64 is connected to the movable core 66 of the solenoid. Core 66 is made of iron or other suitable material as is well known in the art. As shown in the figure, this core 66 does not extend throughout the length of the solenoid but is concentrated at the lower end. A portion 67 of brass or other nonmagnetic material is fastened to the top of core 66 and may include a flanged or headed portion 68 as shown. Portion 67 in effect constitutes a continuation of core 66 but must of necessity be made of nonmagnetic material. Core members 66 and 67 are vertically slidable in the hollow tube 69 of brass or other nonmagnetic material. The brass tube 69 is provided with flanges 71 and 72 at its top and bottom respectively, and these flanges serve to retain the turns of wire which form the solenoid coil 73.

Figure 2:
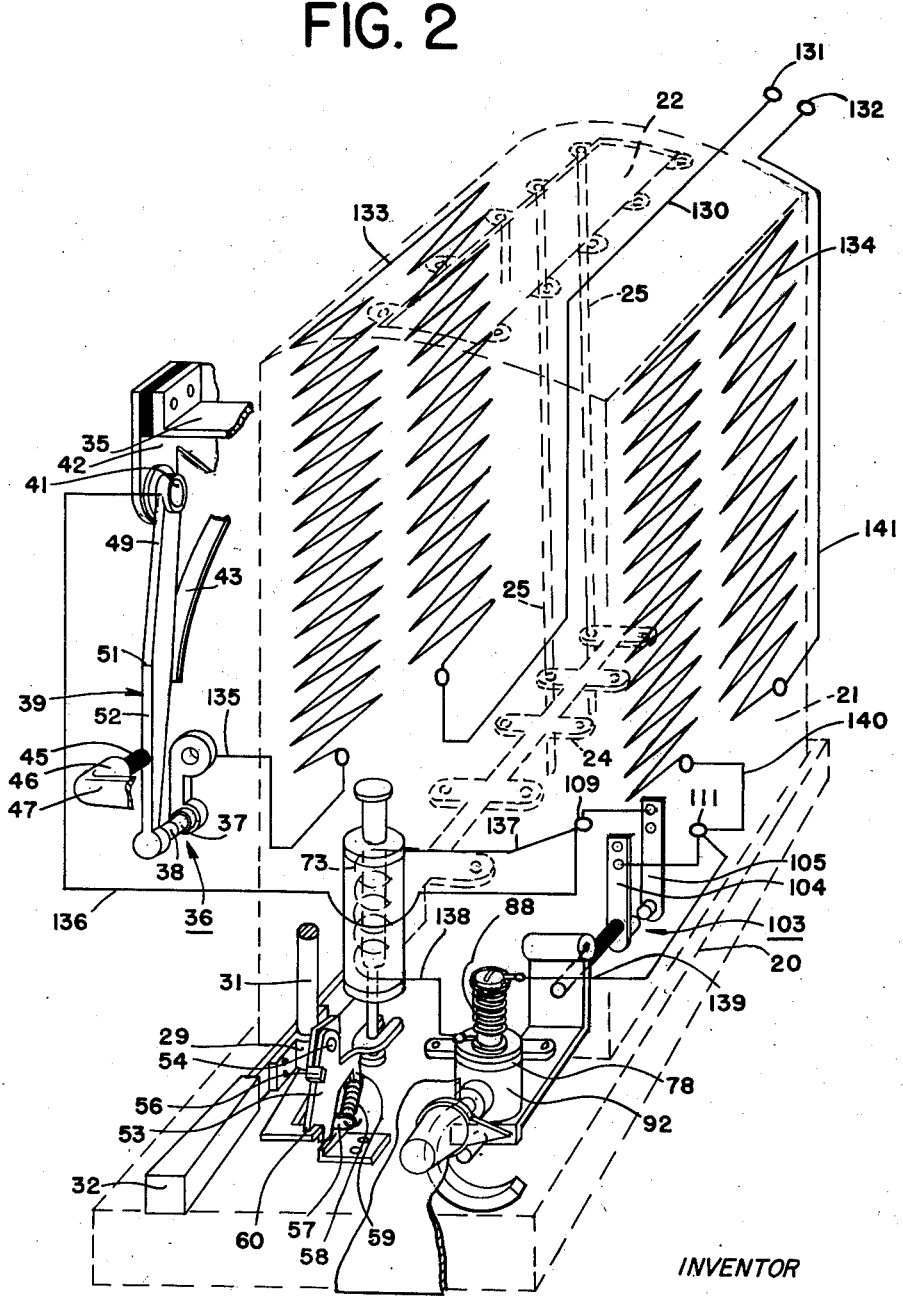
Fig. 2 is a similar view with the manual operating lever of the toaster depressed so that the main switch of the electrical circuit is closed, and the timing operation is started.

As is well understood in the art, passage of an alternating current through coil 73 will tend to lift the core 66 so that the magnetic portion of the core is centered vertically within the solenoid. From the initial position shown in Fig. 1 (and designated in Fig. 5 by the reference "Fig. 1"), closure of the circuit through solenoid 73 will cause a powerful upward movement of this core 66 and rod 64 so that the core will move vertically above the center of the solenoid to the solid line position of Fig. 5 and would in fact be projected upwardly completely out of the solenoid were it not for engagement of the head 65 with fingers 62 and further engagement of the latch 53 with stop lug 57. After this initial upward throw of the core 66, the core and rod will settle back to a position substantially in the center of the solenoid (Fig. 2). Actually the core will be slightly below the center due to the weight of the core members and the downward pull of gravity on them. The parts are arranged as shown in Fig. 5 so that when the core is in its equilibrium position (shown by the reference "Fig. 2") the head 65 will be slightly below the fingers 62 and will permit movement of latch 53 to its full clockwise position for locking engagement with latch arm 33.

The solenoid coil 73 together with the central tube 69 and end flanges 71 and 72 is carried by a suitable strap 74 fastened to a supporting bracket 75. Bracket 75 has a horizontal lower flange 76 fastened to the toaster base 20 by screws 77 or any other desired means.

The operation of the solenoid in cooperation with the main switch will now be apparent. As soon as the operating handle 32 is partially depressed so that plunger 45 moves from position A to position B of Fig. 11, the main switch will be closed and current will surge through the solenoid 73. This surge of current is practically instantaneous and will lift the core 66, rod 64, and fingers 62 to rotate latch 53 to inlocking position. After the initial surge, however, the core will very quickly settle to its equilibrium position and this settling will take place even before the operating lever 32 has been completely depressed. Thus, by the time plunger 45 has progressed downwardly from position B to position C of Fig. 11, the core will have reached its equilibrium position and the spring will have returned latch 53 to the locking position of Fig. 2. Thus, the latch arm 33 can move vertically downward and be held in place beneath the locking surfaces 60 of latch 53.

The latch parts will remain in the position of Fig. 2, with the solenoid core in its equilibrium position as long as current continues to flow through the solenoid coil. When this current is interrupted, the solenoid will be de-energized and the core 66 and rod 64 will drop completely to the lower dotted line position of Fig. 5. When the solenoid circuit is again closed so that current flows through the coil 73 the core 66 will be forced upwardly with sufficient power to overrun its equilibrium position and rotate latch 53 counter clockwise against stop 57. This will release the latch arm 33 so that spring 34 can again raise the slice carrier 24 to its upper or starting position.

*Thermomagnetic timing mechanism*

The magnetic timing unit is constructed as shown in detail in Figs. 6 through 10. A plate 78 of thermomagnetic material serves as the basis for this timing unit. This plate is made of a material such as a nickel steel alloy containing roughly 30% nickel, which has the characteristic that its magnetic permeability is high at ordinary room temperatures and decreases rather suddenly with increase of temperature beyond a critical point. Various alloys are known to possess this property and the selection of a particular alloy will depend on the temperature at which loss of permeability is desired and on the various operating constants of the device, such as the length of timing cycle desired, the size of the heater, and the degree of air circulation in the vicinity of the timer. In the present embodiment of the invention I have used an alloy containing substantially 32.5% nickel, which has a Curie point at approximately 400° F.

Plate 78 is substantially circular in shape and is provided with a pair of projections 79 by which the plate fastened with bolts 81 to the horizontal flanges 82 of a supporting bracket 83. This supporting bracket in turn is fastened to the base or frame of the toaster in any desired manner; for example, by means of projecting tongues 84 which engage slots in the base 20 and will bend over to retain the bracket firmly in position as shown in Figs. 6 and 9.

In order that the heat applied to plate 78 may be spread uniformly through the plate, I have devised a novel arrangement for the auxiliary heater to be used. This heater construction includes the use of an intermediate layer 85 of brass, copper, or other material which has a high thermal conductivity. This intermediate layer 85 may include an upstanding central cylindrical core 86 into which a screw 87 is threaded for clamping the brass intermediate layer firmly against one surface of the thermomagnetic plate 78. Screw 87 is of nonmagnetic material. One object of this screw connection is to hold plate 78 in close heat relation against layer 85 so that the flow of heat from the intermediate layer to plate 78 is facilitated.

A heating coil 88 is wound around the central cylindrical projection of intermediate layer 85 and, as will be readily understood, supplies heat not only downward directly through layer 85 but also toward the center through projection 86 and thence downwardly to layer 85 and plate 78.

It will be apparent from the foregoing description that the heat generated by auxiliary heater coil 88 will be carried downwardly by cylindrical extension 86, and intermediate lever 85 and will be uniformly disseminated throughout the layer 85 by reason of the high thermal conductivity of the layer before the heat reaches plate 78. Thus, plate 78 will receive a uniform application of heat throughout the circular area which is to be used in the timing operation, and its temperatures will be uniform at any given instant throughout the heating and cooling cycles. As shown, layer 85 may be thicker at the center than at the edge, to assist this uniform distribution of heat.

On the opposite face of the plate 78 a small magnet 92 is provided. While any type of magnet may be used, I prefer to employ a permanent magnet, the strength of which has been decreased 20% below its original maximum strength in known manner. In this case, the strength of the magnet will remain more constant during subsequent use. Magnet 92 is oriented so that its pole pieces 93 and 94 are parallel to and closely adjacent the lower surface of plate 78. As shown particularly in Fig. 7, pole pieces 93 and 94 are substantially semicircular in surface shape and are separated by an air gap 95. In a preferred form of the invention I have found that an air gap wider that the width of the individual poles 93 and 94, and at least as deep as this pole width is desirable. By this arrangement I provide for a magnetic field of uniform strength between pole pieces 93 and 94 and plate 78. I have also found that it is essential to coordinate the area of these pole faces with the arrangement of the heating unit of plate 78 so that change in temperature of plate 78 due to action of the heater is substantially uniform throughout the area opposite the magnetic pole faces. In the present construction, this result is achieved by use of the intermediate conductive layer 85 to spread the heat of the coil uniformly throughout the area of plate 78 opposite the pole pieces.

Magnet 92 is fastened by screws 96 or other suitable means on a horizontal arm 97 of a lever 98. Lever 98 is pivoted at 99 to the supporting bracket 83 at a point which is substantially in the plane of the lower surface of plate 78 and is substantially spaced from said plate. Because of this arrangement of the pivot, the pole faces of magnet 92 which are initially substantially parallel to the cooperating surface of plate 78 will remain in parallel relationship to said plate surface throughout limited movements of the magnet and lever 98 away from plate 78.

As shown in Fig. 6, lever 98 includes a substantially vertical arm 101 between pivot 99 and horizontal arm 97. An insulating block 102 is mounted on the vertical arm 101 and is adapted to cooperate with one of the contact members of an auxiliary switch 103. Movement of arm 97 and magnet 92 vertically downward away from plate 78 will cause movement of vertical arm 101 and insulating block 102 horizontally to the right against the spring contact arm 104 of the switch 103. This resilient arm 104 cooperates with another contact arm 105 by means of contact buttons 106 and 107 carried on arms 104 and 105 respectively to close switch 103 when the magnet drops and insulating knob 102 is moved against arm 104.

Switch arms 104 and 105 are mounted on a suitable insulating block 108 which in turn is fastened to the top cross piece 112 of bracket 83 by screws 110 (Fig. 7). Terminals 109 and 111 are provided on top of cross piece 112 and terminal 109 is connected to switch arm 105 while terminal 111 is connected to switch arm 104 as shown schematically in Fig. 1. Thus, when switch 103 is closed, it will establish an electrical connection between terminals 109 and 111.

In order to limit the movement of magnet 92 and lever arm 98 a projection 113 is mounted on the downwardly turned end 114 of lever 98 near the end of the lever on which the magnet 92 is mounted. It will be obvious that the stop could be positioned at any other suitable point. Upward movement of stop 113 (and consequently of lever 98 and magnet 92) is limited by engagement of projection 113 against the lower edge 115 of the vertical front wall 116 of supporting bracket 83. Preferably, the parts are so positioned that the pole faces approach very closely to plate 78 but do not quite come into actual contact with the plate. In any event, the upper limiting position for magnet 92 must be such that the surfaces of the pole pieces are substantially adjacent the surface of plate 78 in order that the air gap at this point will be so small that there will be a strong attractive force between the pole faces and plate 78.

Downward movement of magnet 92 and arm 97 is limited by engagement of the projection 113 against upper cam surface 117 of an adjustable stop member 118 pivoted at 119 to the wall 116 of supporting bracket 83. The pivotal mounting of the stop member 118 may include a screw 121 and a friction washer 122 (shown particularly in Figs. 6 and 10). This construction is adapted to permit manual adjustment of the position of stop member 118 and at the same time to provide sufficient friction to hold the stop member in whatever position is desired by the user. Stop member 118 may include a cylindrical hub portion 123 to which a manual control knob 124 is connected by means of a connecting shaft 125 threaded into hub 123. Shaft 125 projects outwardly through the main toaster casing so that knob 124 is on the outside of the toaster where it is readily accessible for manipulation.

This knob 124 may include a pointer 126 adapted to cooperate with a suitable scale 127 on the toaster casing as shown in Fig. 8. This scale indicates to the user the relative settings necessary to obtain a longer or shorter timing period. Thus, in the case of the toaster illustrated, a long timing period will result in production of darker toast, whereas a short timing period will produce light toast, and scale 127 may be graduated accordingly.

It will be clear from Figs. 9 and 10 that limiting surface 117 of stop member 118 is in the form of a spiral cam with reference to the pivot 119. In other words, one end 128 of surface 117 is closer to the center of pivot 119 than is the other end 129 of limiting surface 117. Thus, when the stop member is adjusted to the "light" position, portion 128 of the limiting surface 117 will be directly beneath the projection 113 and and will permit a relatively short downward movement of projection 113 and consequently of magnet 92. On the other hand, when the knob 124 is set in the "dark" position, portion 129 of limiting surface 117 will be beneath the projection 113 and will permit a slightly greater downward movement of the projection and of magnet 92. The manner in which this change in the lower limit of movement of the magnet controls the length of the timing operation will be explained below.

Electrical connections

With the foregoing description of the mechanical construction of the various parts in mind, the details of the electrical circuit will now be explained:

With reference to Fig. 1, the toaster and timer circuits are as follows: Terminals 131 and 132 are provided for connection to the usual source of current, said source normally being a 110 volt alternating current circuit. From terminal 131, the current passes by means of a connector 130 to resistance coils 133 at one side of the toaster. A similar resistance coil 134 at the other side of the toaster is connected by wire 141 to terminal 132. Resistance 133 is in turn connected by wire 135 to the fixed contact 37 of main switch 36. The other contact 38 of the main switch is connected by a wire 136 to terminal 109 on the timing unit switch 103.

When the operation of the toaster is started, the main switch is closed and current from line terminal 131 passes through resistance 133 and the main switch directly to terminal 109. From this terminal the current passes by a wire 137 to the coil 73 of the solenoid in the electromagnetic latch-releasing device. Solenoid coil 73 is connected by wire 138 to the auxiliary heater coil 88 in the thermomagnetic timing unit. From coil 88 the current is carried by wire 139 to terminal 111 of switch 103. From terminal 111 the current then flows through wire 140 to main resistance 134 and thence by wire 141 to line terminal 132 to complete the circuit. When switch 103 is closed subsequently by the electromagnetic timing device, it will connect terminals 109 and 111 directly, thus shunting out the solenoid coil 73 and auxiliary heater coil 88.

Operation

With the foregoing mechanical and electrical details of construction in mind, the operation of the device is as follows: A piece of bread is inserted in slot 25 and is held in position upon the slice carrier. Handle 32 is then depressed. During the downward movement of the handle, projection 45 will first move from position A to position B of Figure 11 and will close the main switch. This will complete the circuit from the line terminals through the toasting coils, the solenoid coil, and the auxiliary heater. As a result, the core 66 of the solenoid will be thrown upwardly to the heavy line position of Fig. 5 and will then immediately settle to its equilibrium position as shown in Fig. 2. Further downward movement of handle 32 will cause movement of plunger 45 from position B to position C of Figure 11, or in other words, to the position of Fig. 2. In this latter position the latch arm 33 will be locked beneath the locking surface 60 of latch 53.

Since the action of the electrical circuit through the solenoid is substantially instantaneous, the solenoid will have been actuated and will have settled to its equilibrium position before the user can complete the manual depression of handle 32. Thus, by the time the handle reaches the bottom of its movement, latch 53 will be returned to a position in which it can engage the latch arm 33 and hold the slice carrier 24, support 26, and handle 32 in their lower position against the tension of return spring 34.

In this initial position of the parts, the thermomagnetic plate 78 is relatively cool. In other words, it is at room temperature if this is the first operation. The magnetic permeability of the plate is accordingly sufficiently high so that the magnet 92 will be attracted to the plate and will be held upwardly so that switch 103 is open.

Figure 3:
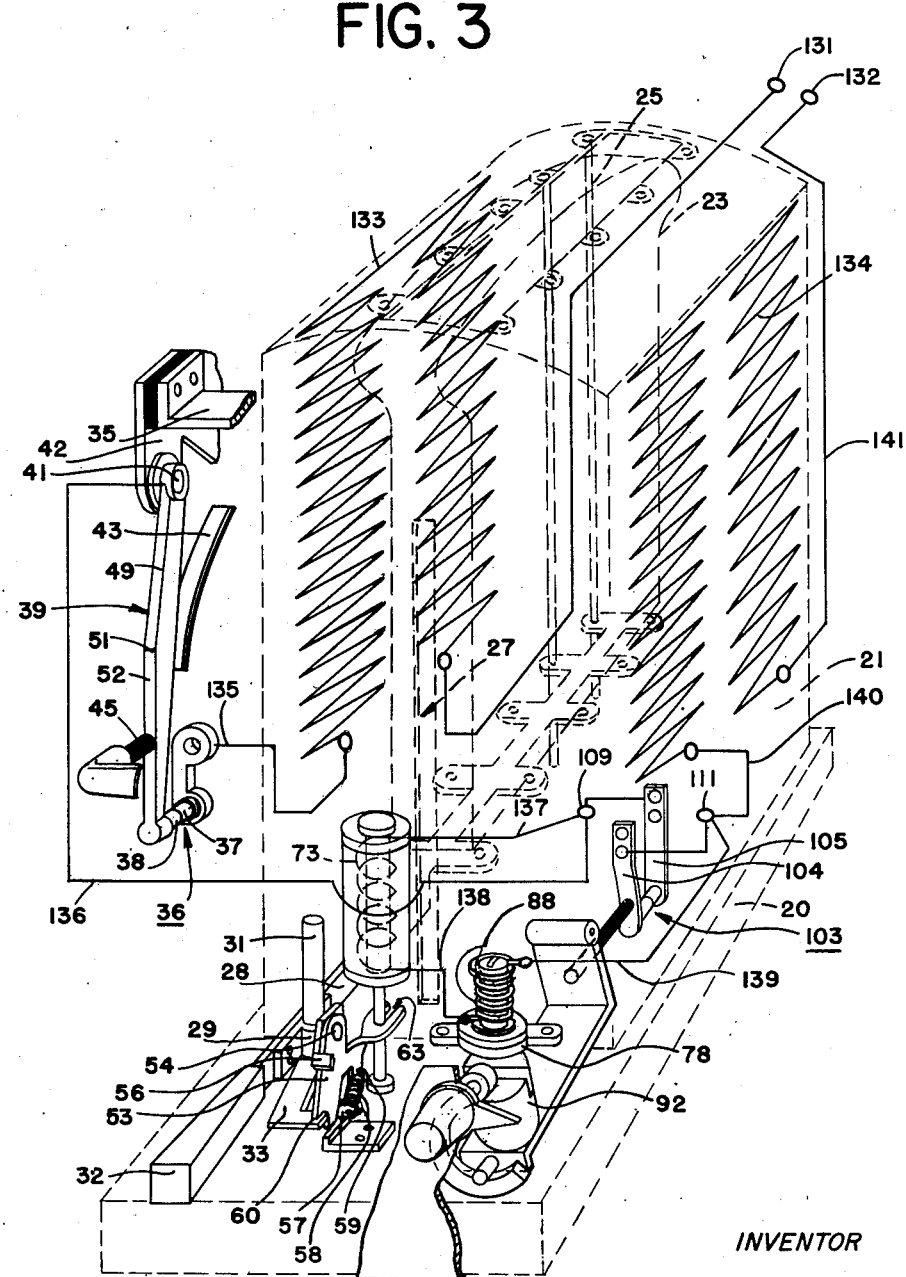
Fig. 3 is a similar view of the device with the timing mechanism in the position it occupies during the latter part of the timing cycle.

In this initial position of Fig. 3 the circuit through the toasting coils, solenoid, and auxiliary heater is complete, and the auxiliary heater will accordingly raise the temperature of thermomagnetic plate 78. When this temperature reaches the critical predetermined point (which depends on the characteristics of the material, the strength of the magnet, and the weight of the magnet and supporting arm), the permeability of plate 78 will be reduced sufficiently so that the magnet will drop. Downward movement of the magnet will, of course, be limited by the adjustable stop member 118.

The downward movement of the magnet and lever arm 97 causes the closing of switch 103 as previously described. Thus, terminals 109 and 111 are connected directly to each other and the circuit through the solenoid coil 73 and auxiliary heater 88 is effectively by-passed. The current in the solenoid accordingly drops to zero, the solenoid is de-energized, and the core member 66 and rod 64 drop to their lowermost position as shown in Fig. 3. At the same time, the cessation of current in the auxiliary heater 88 permits plate 78 and intermediate layer 85 to cool. These parts cool until the magnetic permeability of plate 78 has been restored sufficiently so that magnet 92 will be reattracted to the plate and will be lifted to open switch 103 again. The presence of conductive layer 85 insures uniform cooling of all areas of the plate.

On this second opening of switch 103, current will again flow through the solenoid coil 73 and auxiliary heater 88. This flow of current will throw the core 67 of the solenoid upwardly with sufficient force to rotate latch 53 against stop 57. In this position, the latch no longer engages the latch arm 33 and consequently the return spring 34 will lift the slide 28, operating handle 32, and slice carrier 24 to their uppermost position. In the course of this upward movement, the main switch 36 will also be opened and the electrical circuit through the toasting coils, solenoid, and auxiliary heater will be interrupted. Since this interruption takes place almost instantaneously due to the rapid action of the solenoid, heater 88 will be de-energized before it has an opportunity to raise substantially the temperature of plate 78. Plate 78 is therefore in condition for insertion of another bread slice and a repetition of the toasting operation as described above.

Operation of this timing unit automatically compensates for any residual temperature in the toasting chamber. Thus, if the next piece of toast is made immediately after termination of the first toasting operation, plate 78 will not have had time to cool down completely to room temperature. Therefore, it will require less time for auxiliary heater 88 to raise the temperature of plate 78 to the critical point at which the magnet 92 will drop.

On the other hand, if there is a considerable delay before the next toasting operation, plate 78 will have an opportunity to cool down substantially so that the time required to raise it to the critical temperature for release of the magnet will be increased. Proper coordination of the cooling characteristics of plate 78 with the cooling characteristics of the main toasting oven makes this automatic compensation of the timing cycle thoroughly accurate so that toast of a uniform color will be obtained regardless of the relative frequency or infrequency of the successive toasting operations. This coordination of the cooling characteristics may be achieved in part by proper ventilation of the chamber in which the timer is located, for example by means of openings 89 beneath the unit and openings 91 in the front and side walls of the chamber. An insulating partition 100 may enclose the inner sides of the timer chamber as shown.

The cooling characteristics of the timing unit may also be modified by provision of a cover member partially or entirely enclosing the heating coil 88 as shown in Figs. 12 and 13. In the embodiment of Fig. 12 the plate 78 of thermomagnetic material is positioned against a layer 150 of high thermal conductivity as previously described, by means of a nonmagnetic screw 152. In this case, layer 150 is of uniform thickness. An integral central hub 151 of the same conductive material serves as a support for the coil 88. A cup-shaped cover member 155 is fastened to the top of central hub 151 by means of a screw 153 and washer 154. The sides of this cup-shaped cap 155 are provided with openings 156 to permit limited circulation of the air to cool the coil 88, hub 151, and conductive layer 150.

In the embodiment of Fig. 13, the construction of the thermomagnetic plate 78, conductive layer 150, central support 151, and coil 88 is similar. In this case, however, the cup-shaped cover or shell 157 is provided with radial cooling fins 158 and is entirely closed. Thus the cooling fins serve to provide even more limited removal of the heat from the timer parts than in the previous embodiment.

In both the devices of Figs. 12 and 13 the lower peripheral edges of the cover members 155 and 157 respectively are in contact with the outer edges of thermally conductive plate 150 and thus serve the two-fold purpose of furthering the uniform conduction of heat from coil 88 to layer 150 and of aiding the uniform cooling of plate 150 when coil 88 is de-energized. Thus by proper choice of the construction surrounding the coil 88, further coordination of the cooling characteristics of this coil with those of the toaster chamber may be achieved.

The operation of the variable stop member 118 will be apparent from the foregoing description. When this stop member is set for light toast, i. e. for a shorter time period, the magnet 92 will drop a shorter distance away from plate 78 than when the stop member is set for dark toast, or a longer time period. Since the actual physical force of attraction between the magnet and the plate 78 is a function not only of the permeability of plate 78 and strength of magnet 92 but also of the distance between these two members, it will be seen that for a shorter air gap between the magnet and the plate, a lower magnetic permeability of plate 78 will suffice to lift the magnet. Since the increase in permeability of plate 78 upon cooling is a function of time, it is thus apparent that with a short air gap it will require less time for plate 78 to cool down to a point where magnet 92 will be reattracted than is the case when the air gap is substantially larger.

With the 32.5% nickel alloy mentioned above, and the construction shown, the magnet will drop when the temperature of plate 78 reaches approximately 400° F. If the gap between magnet and plate is of the order of one-sixteenth of an inch, the magnet will be reattracted when the plate 78 cools to roughly 300° F.

Another embodiment of the invention is shown in Figs. 14 through 16 inclusive. In this case, the elements of the timing unit are identical except that they are carried by a supporting frame 160 so arranged that movement of magnet arm 98 takes place in a horizontal plane rather than a vertical plane. Since gravity is ineffective in this position to pull the magnet 92 away from plate 78 when the latter reaches the critical temperature, the arm 98 is provided with a bracket 161 to which is attached a horizontal spring 162. The other end of spring 162 is connected to an arm 163 on the supporting frame 160 of the timer unit. Thus when the plate 78 reaches the critical temperature, spring 162 will pull arm 98 and magnet 92 away from the plate to close switch 103 in the manner previously described. The same variable stop member 118 is utilized to adjust the duration of the timed period.

Thus I have produced a magnetic timing device which is fully adjustable for different periods of time and which makes use not only of the change in magnetic permeability of plate 78 with respect to temperature but also uses a variation in the length of movement of the magnet 92 to achieve the necessary adjustment. Previous attempts to adjust a timer of this general class have involved adjustment of a spring tending to separate the magnet and plate, or adjustment of the initial flux density. These adjustments vary the time during which the thermomagnetic material is heated. I have found, however, that such control of the heating period is often difficult and inaccurate. By adjustment of the air gap between the plate and magnet during the relatively longer cooling period of the thermomagnetic plate, a much more accurate and dependable control of the total time cycle may be obtained.

Furthermore, the construction of the auxiliary heater unit 88 with a layer of material of high thermal conductivity between the heating coil and plate 78 serves to distribute the heat more evenly throughout plate 78 so that the change in permeability will be uniform at all points and magnet 92 will be released and reattracted as a unit in a much more accurate and effective manner than would be the case if the temperature and permeability of plate 78 were non-uniform. Also the transmission of heat across a relatively thin plate of thermomagnetic material from one face to the other is more uniform and efficient than the conduction of heat longitudinally of a bar as in certain prior art devices. The uniformity achieved by the present construction makes it possible to produce these timing units in quantity and to achieve the necessary accuracy of operation without individual changes in the structure and design of each separate timing unit.

The term "thermomagnetic material" is used throughout the foregoing specification and the following claims to designate any of the well known materials whose variation in magnetic permeability with respect to temperature exhibits the characteristics described.

Various changes in the specific embodiments of the invention described above can be made by those persons skilled in the art without departure from the essential teachings of this specification. It is therefore my intention that the invention is not to be limited by the exact details of construction shown, but only by the spirit and scope of the attached claims.

Now, therefore, I claim:

1. An electric timing device for operating a member after a predetermined time interval, comprising a plate of thermomagnetic material, a heater in operative relationship with one surface of said plate, a magnet having its pole pieces adjacent another surface of said plate, said plate and magnet being relatively movable between a first position in which said pole pieces are substantially close to said surface and a variable second position in which said pole pieces are spaced a predetermined distance from said surface, an adjustable stop for limiting the relative movement of said magnet and plate to determine said distance, and means responsive to relative movement of the plate and magnet for operating said member at the end of a time interval which includes at least one relative movement from said second to said first position, whereby the interval may be varied by adjustment of said stop to change said distance.

2. An electric timing device for operating a member after a predetermined time interval, comprising a plate of thermomagnetic material, an electric heater in operative relationship with one surface of said plate, a magnet having its pole pieces adjacent the opposite surface of said plate, said plate and magnet being relatively movable between a first position in which said pole pieces are substantially close to said surface and a variable second position in which said pole pieces are spaced a predetermined distance from said surface, an adjustable stop for limiting the relative movement of said magnet and plate to determine said distance, and means responsive to relative movement of the plate and magnet for operating said member at the end of a time interval which includes at least one relative movement from said second to said first position, whereby the interval may be varied by adjustment of said stop to change said distance.

3. In a timing device, in combination, a plate of thermomagnetic material, a heater on one surface of said plate, a magnet having pole pieces relatively movable toward and away from the opposite surface of the plate in response to predetermined changes in magnetic permeability of the plate, means actuated by such relative movement thereby indicating a given time interval, and a layer of material of relatively greater thermal conductivity than the plate substantially coextensive with said surface and interposed between said surface and said heater, said layer being in direct heat-conductive engagement with said plate.

4. In a timing device, in combination, a plate of thermomagnetic material, a layer of material of higher thermal conductivity than the plate mounted against one surface of said plate and substantially coextensive therewith, said layer including an integral upstanding central core portion, and an electrical heating coil mounted on said core portion.

5. In a timing device, in combination, a plate of thermomagnetic material, a layer of material of relatively greater thermal conductivity than the plate on one surface of said plate and substantially coextensive therewith, said layer including an integral upstanding central core portion, an electrical heating coil mounted on said core portion, and a cover of material of good thermal conductivity surrounding said heating coil and in contact with said layer to provide a path for heat flow between the outer portion of the coil and the layer and plate.

6. An electric timing device comprising a member to be operated after a predetermined time interval, a plate of thermomagnetic material of relatively great surface area as compared to its thickness, an electric heater in conductive relation with one surface of the plate, a magnet having its pole pieces adjacent the opposite surface of the plate, a lever on which the magnet is mounted, said lever being pivoted at a point in the plane of said opposite surface and relatively spaced from the plate for movement of the lever and magnet between a first position in which the magnet is close to the plate and a second position in which the magnet is spaced away from the plate, a switch actuated by movement of the lever from said second to first position, and electrical means controlled by the switch and operating said member at the end of a time interval which includes at least one movement of the lever from second to first position.

7. A timing device according to claim 6, having a manually adjustable stop engaged by the lever to limit movement of the magnet away from the plate, adjustment of the stop thereby changing the second position to vary the timed interval.

8. A timing device according to claim 6 in which the heater is operatively connected to the switch and is deenergized when the magnet moves away from the plate.

9. An electric timing device comprising a movably mounted operating lever normally urged to one position and manually movable to a second position, a latch for holding the lever in its second position, a main switch closed by the lever during movement of the lever to its second position, a solenoid having a core engageable with the latch to release the latch momentarily when the solenoid is energized, said core having an equilibrium position during continued energization of the solenoid in which the latch is free to engage and hold the lever in its second position, a plate of thermomagnetic material, an electric heater in conductive relation with one surface of the plate, a magnet having its pole pieces adjacent the opposite surface of the plate, the magnet and plate being mounted for relative separating movement when the plate is heated, an auxiliary switch actuated by the separating movement, said solenoid and heater being connected in series with each other and with said main switch, and said auxiliary switch effectively deenergizing the solenoid and heater when the magnet and plate separate, and reenergizing the solenoid and heater to release the latch and open the main switch when the magnet and plate are reattracted upon cooling of the plate.

10. A timing device according to claim 9 having adjustable means for limiting the relative separation of the plate and magnet to predetermine the length of the timed cycle.

11. A timing device according to claim 9 in which the plate is fixed in position and the magnet is mounted on a lever pivoted in the plane of said opposite surface of the plate at a point relatively separated from the plate.

12. An electric timing device comprising a solenoid to be operated at the end of a predetermined time interval, a plate of thermomagnetic material, an electric heater in conductive relation with one surface of the plate, a magnet having its pole pieces adjacent the opposite surface of the plate, the magnet and plate being mounted for relative separating movement when the plate is heated, a switch actuated by the separating movement and connected in circuit with the solenoid and the heater, said switch deenergizing the heater when the magnet and plate separate upon heating of the plate, and causing operation of the solenoid when the magnet and plate are reattracted upon cooling of the plate.

13. An electric timing device comprising manually operable setting means, a solenoid to be operated at the end of a predetermined time interval, a plate of thermomagnetic material, an electric heater in conductive relation with one surface of the plate, a magnet having its pole pieces adjacent the opposite surface of the plate, the magnet and plate being mounted for relative separating movement when the plate is heated, a switch actuated by the separating movement and connected in circuit with the solenoid and the heater, said switch deenergizing the heater, when the magnet and plate separate upon heating of the plate, and causing operation of the solenoid when the magnet and plate are reattracted upon cooling of the plate, and means responsive to operation of the solenoid preventing recycling of the device until the setting means is again operated.

14. An electric timing device comprising manually operable setting means, an electric circuit to be energized at the end of a predetermined time interval, a plate of thermomagnetic material, an electric heater in conductive relation with one surface of the plate, a magnet having its pole pieces adjacent the opposite surface of the plate, the magnet and plate being mounted for relative separating movement when the plate is heated, a switch actuated by the separating movement and connected with the circuit and the heater, said switch deenergizing the heater when the magnet and plate separate upon heating of the plate, and causing energization of the circuit when the magnet and plate are reattracted upon cooling of the plate, and means responsive to operation of the solenoid preventing recycling of the device until the setting means is again operated.

MAURICE H. GRAHAM.

REFERENCES CITED

The following references are of record in the file of this patent:

UNITED STATES PATENTS

| Number | Name | Date |
| --- | --- | --- |
| 1,655,847 | Siebs | Jan. 10, 1928 |
| 1,655,852 | Adams | Jan. 10, 1928 |
| 1,692,626 | Chapman | Nov. 20, 1928 |
| 2,269,162 | Newell | Jan. 6, 1942 |
| 2,437,488 | Ulanet | Mar. 9, 1948 |